US011901651B2

(12) United States Patent
Sunahara

(10) Patent No.: US 11,901,651 B2
(45) Date of Patent: Feb. 13, 2024

(54) ANTENNA COMPONENT

(71) Applicant: Murata Manufacturing Co., Ltd., Nagaokakyo (JP)

(72) Inventor: Minoru Sunahara, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 42 days.

(21) Appl. No.: 17/847,238

(22) Filed: Jun. 23, 2022

(65) Prior Publication Data

US 2023/0010805 A1 Jan. 12, 2023

(30) Foreign Application Priority Data

Jul. 7, 2021 (JP) ................................. 2021-112618

(51) Int. Cl.
*H01Q 7/00* (2006.01)
*H01Q 9/40* (2006.01)

(52) U.S. Cl.
CPC ................. *H01Q 9/40* (2013.01); *H01Q 7/00* (2013.01)

(58) Field of Classification Search
CPC ........... H01Q 9/40; H01Q 7/00; H01Q 1/2216
See application file for complete search history.

(56) References Cited

U.S. PATENT DOCUMENTS

| | | | | |
|---|---|---|---|---|
| 8,754,823 B2 * | 6/2014 | Ohara | H01Q 7/08 343/788 |
| 9,768,510 B2 * | 9/2017 | Tanaka | H01Q 7/08 |
| 10,141,649 B2 * | 11/2018 | Miura | H01Q 1/36 |
| 11,165,154 B2 * | 11/2021 | Suzuki | H01Q 7/00 |
| 2011/0215987 A1 * | 9/2011 | Ohara | H01Q 1/3241 343/906 |
| 2017/0155188 A1 * | 6/2017 | Kikuchi | H01Q 7/00 |
| 2017/0301995 A1 | 10/2017 | Tanaka et al. | |

FOREIGN PATENT DOCUMENTS

JP 6701907 B2 5/2020

* cited by examiner

*Primary Examiner* — Hai V Tran
*Assistant Examiner* — Michael M Bouizza
(74) *Attorney, Agent, or Firm* — Keating & Bennett, LLP

(57) ABSTRACT

A body includes a support strut extending in a second direction. A first terminal includes a first fastening portion to exert a force on the support strut in a third direction perpendicular or substantially perpendicular to the second direction, a second fastening portion to exert a force on the support strut in a fourth direction opposite to the third direction, a first coupling portion coupled to the first protrusion and the second protrusion, and a contact portion coupled to at least one of the first fastening portion, the second fastening portion, or the first coupling portion, the contact portion extending in a fifth direction perpendicular or substantially perpendicular to the second direction.

15 Claims, 9 Drawing Sheets

ANTENNA COMPONENT

CROSS REFERENCE TO RELATED APPLICATIONS

This application claims the benefit of priority to Japanese Patent Application No. 2021-112618 filed on Jul. 7, 2021. The entire contents of this application are hereby incorporated herein by reference.

BACKGROUND OF THE INVENTION

1. Field of the Invention

The present invention relates to an antenna component including a body and a conducting wire wound around the body.

2. Description of the Related Art

An antenna device is known as an invention relating to an existing antenna component. The antenna device includes a coil, a bobbin body, and a terminal member. The coil is wound around the bobbin body. The terminal member is fastened to the bobbin body. More specifically, the terminal member has an L shape. The terminal member is received in a through-hole formed in the bobbin body. One end of the coil is connected to the terminal member.

As described above, in the antenna device described in Japanese Patent No. 6701907, the terminal member is received in the through-hole formed in the bobbin body. Thus, while being inserted into the through-hole, the terminal member comes into contact with the inner circumferential surface of the through-hole, and shaves the inner circumferential surface of the through-hole. Thus, in the antenna device described in Japanese Patent No. 6701907, a slight gap may be formed between the inner circumferential surface of the through-hole and the terminal member, and the terminal member may be slightly shifted with respect to the bobbin body. The antenna device described in Japanese Patent No. 6701907 is thus not suitable for firmly fastening the terminal member to the bobbin body.

SUMMARY OF THE INVENTION

Preferred embodiments of the present invention provide antenna devices each able to firmly fasten a first terminal to a body.

An antenna component according to a preferred embodiment of the present invention includes a body extending in a first direction, a coil antenna including a conducting wire wound around the body about an axis extending in the first direction defining a center axis, the coil antenna including a first end portion and a second end portion, a first terminal on the body and electrically connected to the first end portion, the first terminal being a single metal member, and a second terminal on the body and electrically connected to the second end portion, wherein the body includes a support strut extending in a second direction perpendicular or substantially perpendicular to the first direction, and the first terminal includes a first fastening portion to exert a force on the support strut in a third direction perpendicular or substantially perpendicular to the second direction, a second fastening portion to exert a force on the support strut in a fourth direction opposite to the third direction, a first coupling portion coupled to the first fastening portion and the second fastening portion, and a contact portion coupled to at least one of the first fastening portion, the second fastening portion, or the first coupling portion, the contact portion extending in a fifth direction perpendicular or substantially perpendicular to the second direction.

According to preferred embodiments of the present invention, a first terminal is able to be firmly fastened to a body.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are described below with reference to the drawings.

PREFERRED EMBODIMENT

Structure of Antenna Component 10

Figure 1:
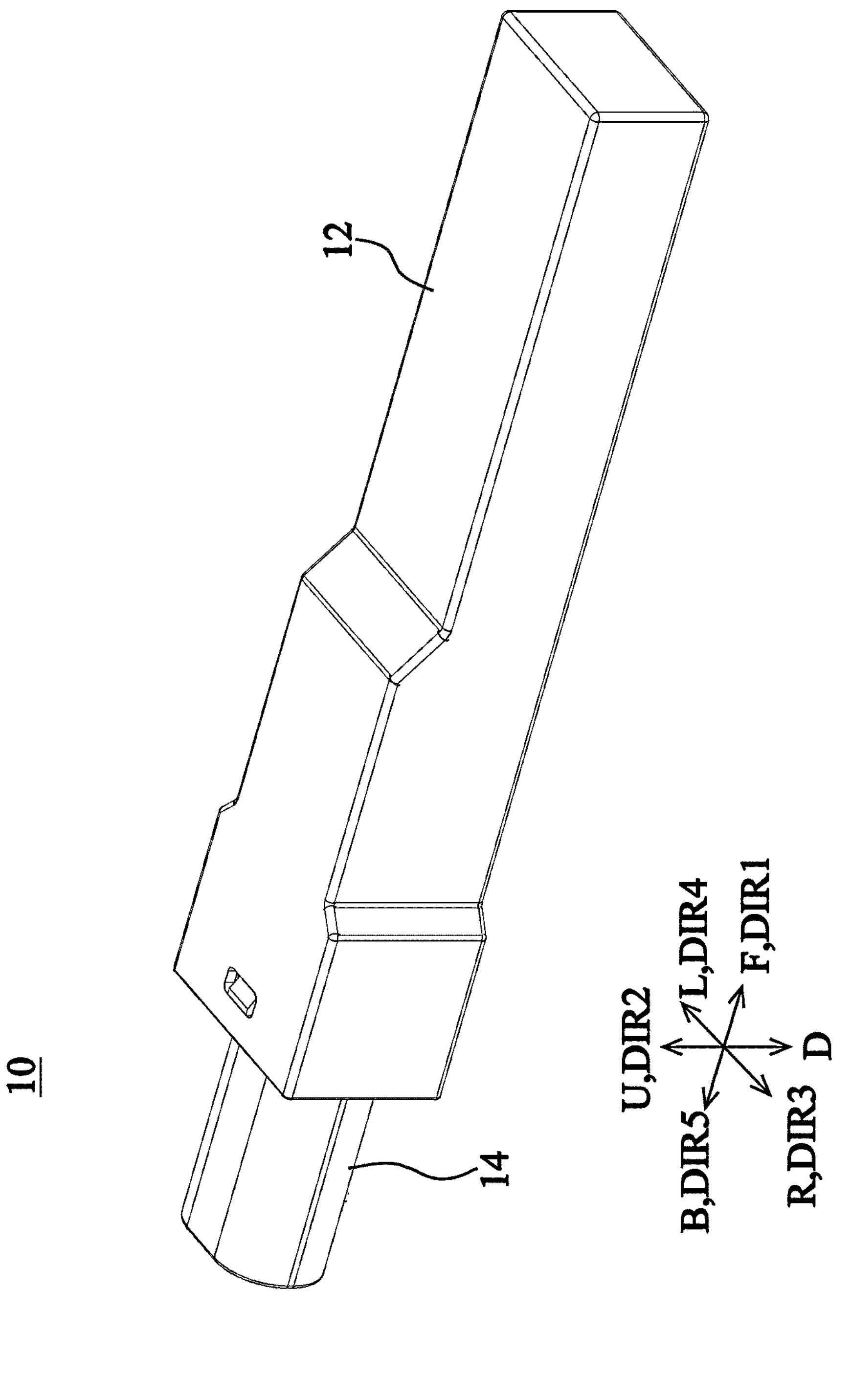
FIG. 1 is a perspective view of an antenna component 10 according to a preferred embodiment of the present invention.
Figure 2:
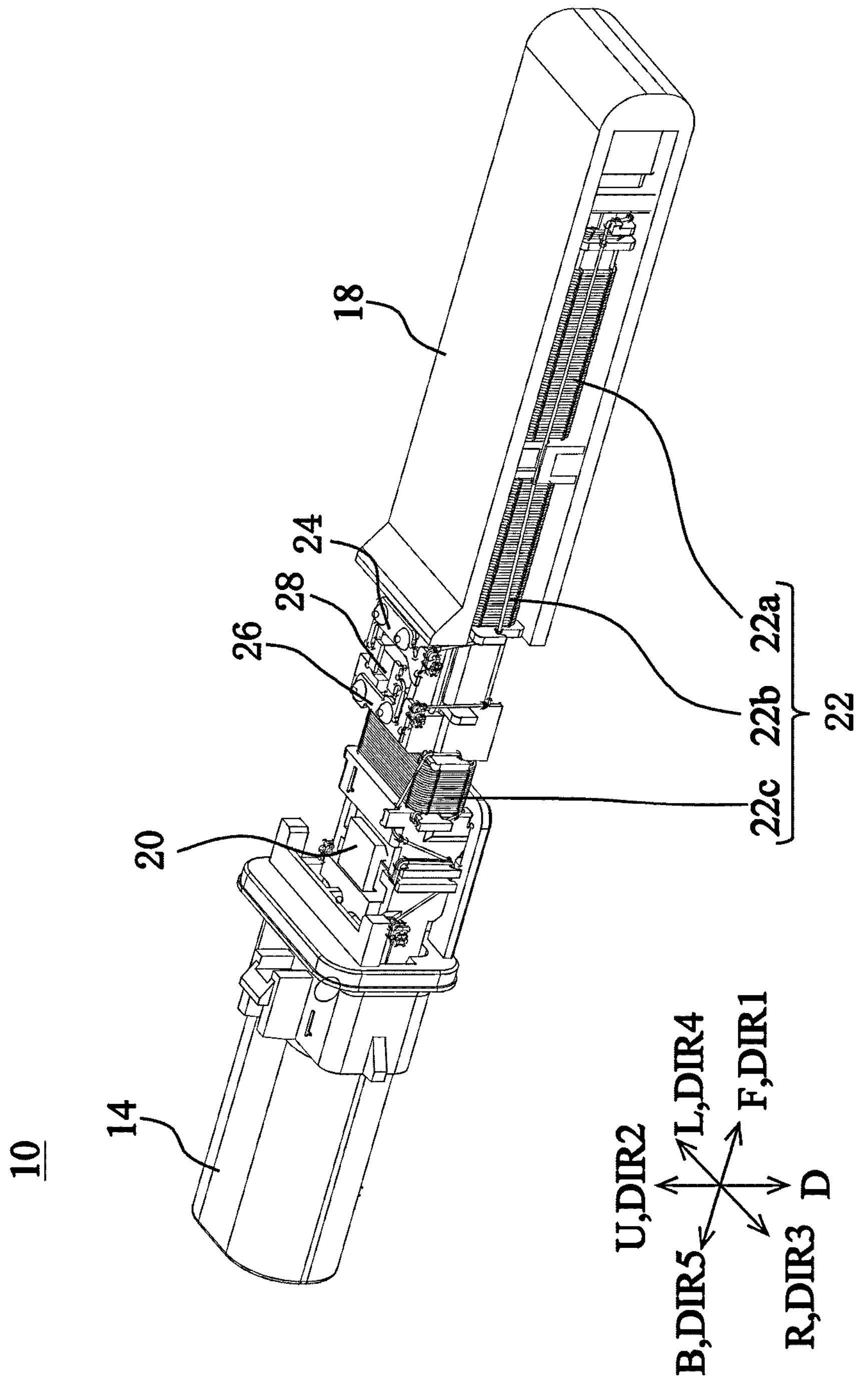
FIG. 2 is a perspective view of the antenna component 10 from which a cover 12 is removed.
Figure 3:
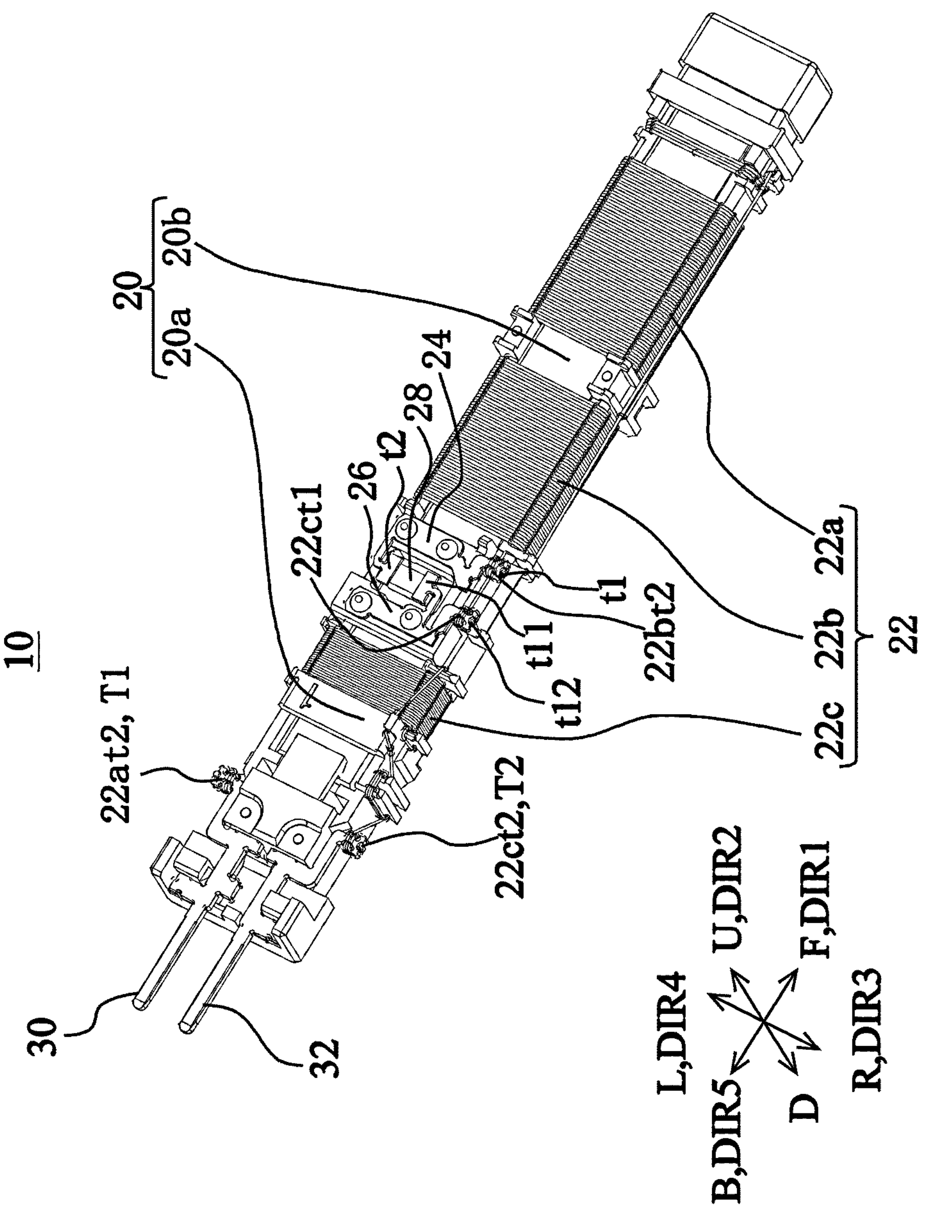
FIG. 3 is a perspective view of the antenna component 10 from which the cover 12, a cover 14, and a spacer 18 are removed.
Figure 4:
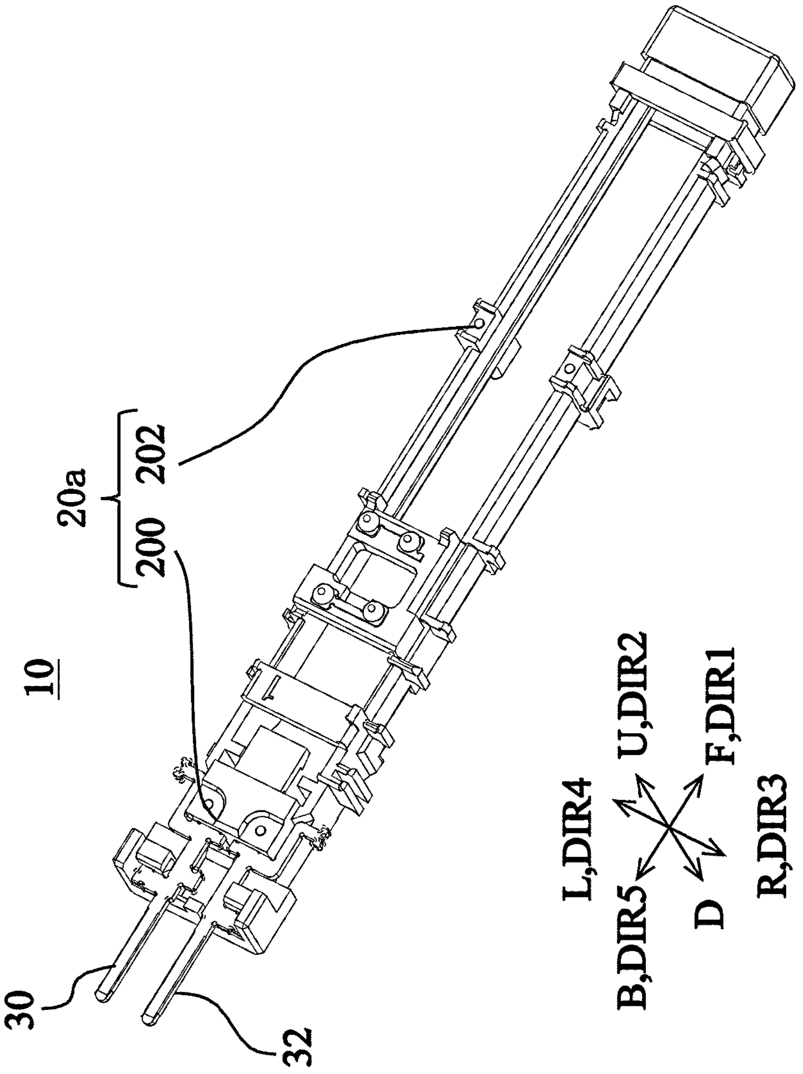
FIG. 4 is an external perspective view of a bobbin 20*a*, a first terminal 30, and a second terminal 32.
Figure 5:
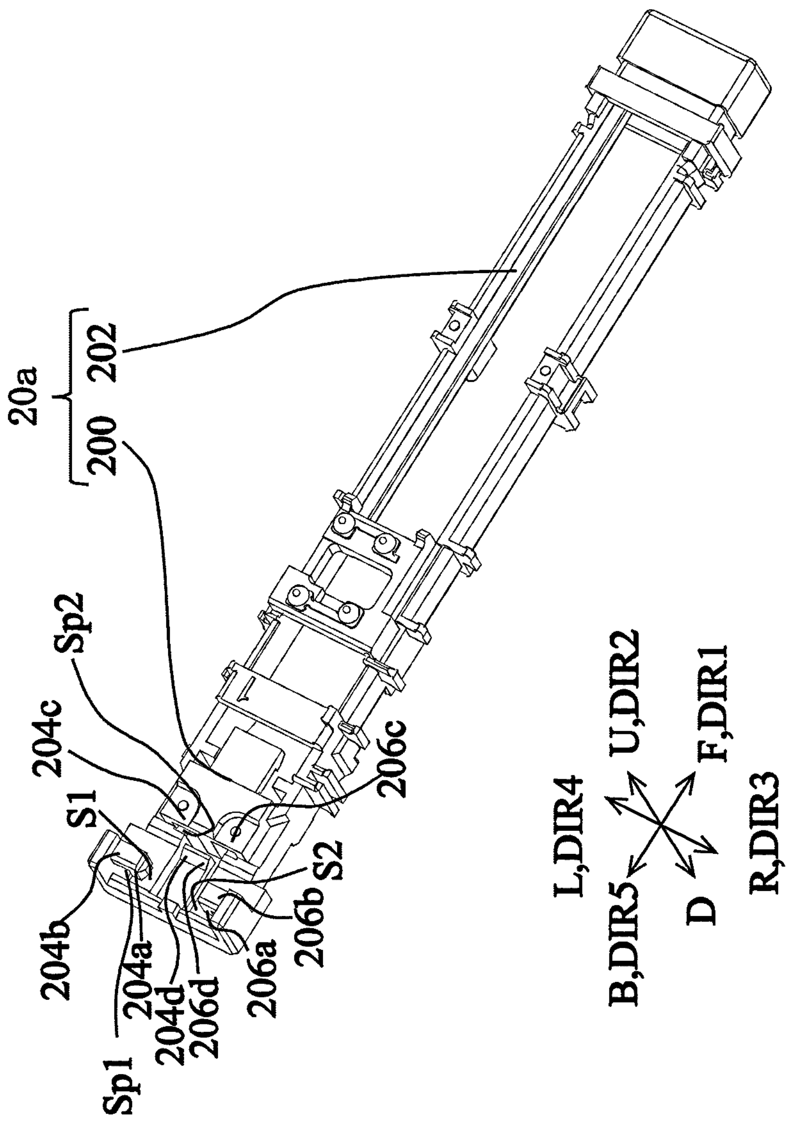
FIG. 5 is a perspective view of the bobbin 20*a*.
Figure 6:
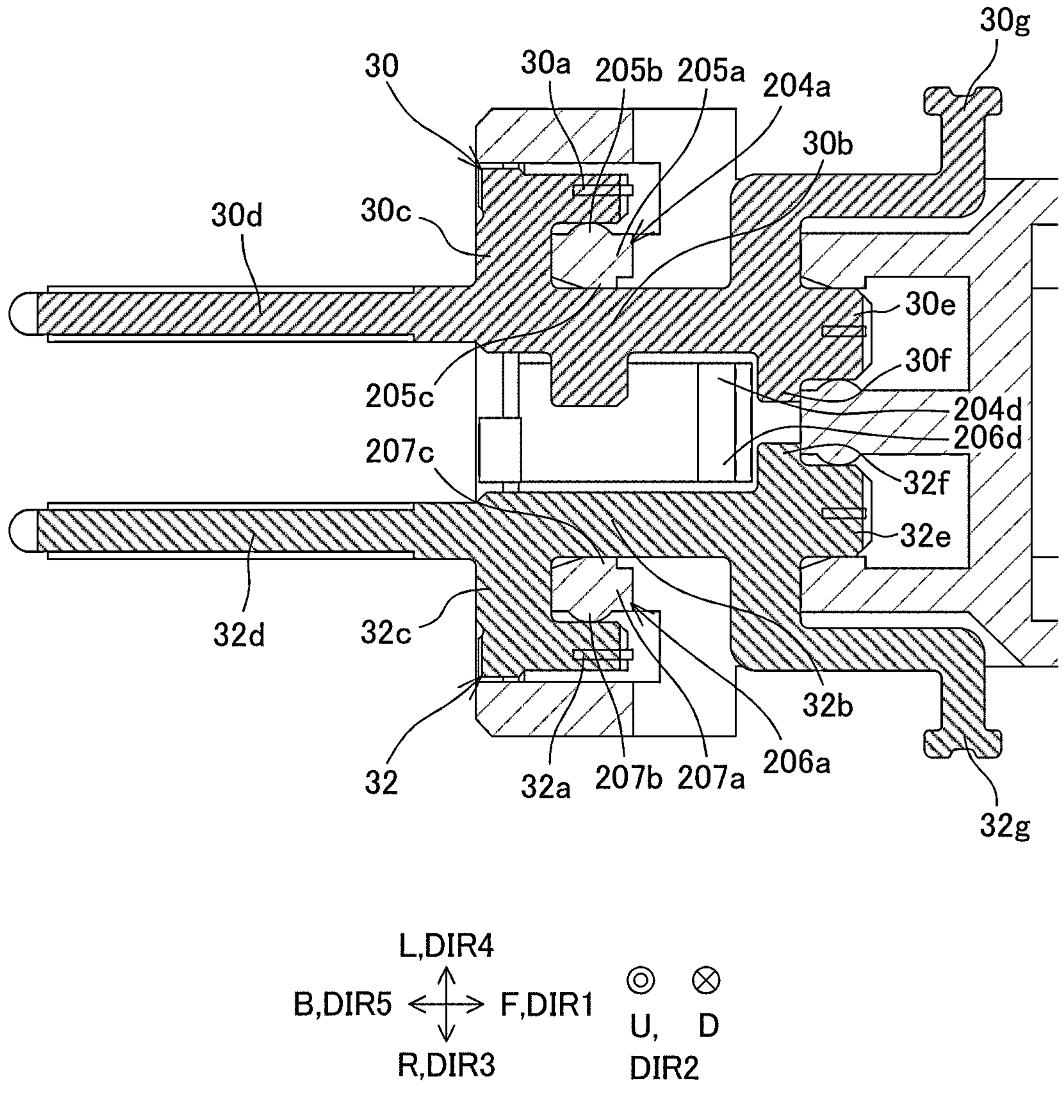
FIG. 6 is a cross-sectional view of the bobbin 20*a*, the first terminal 30, and the second terminal 32 taken perpendicular or substantially perpendicularly to a vertical direction.
Figure 7:
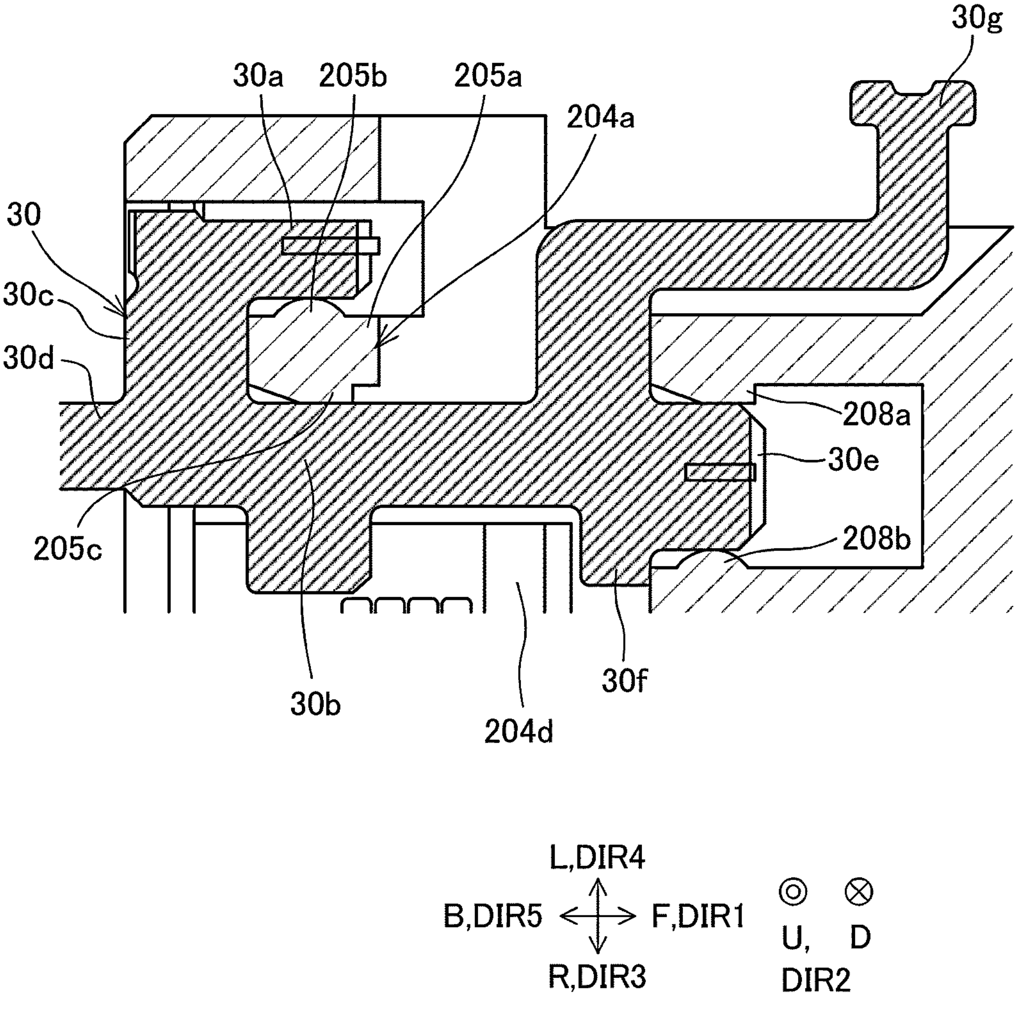
FIG. 7 is an enlarged view of a front portion of the first terminal 30 illustrated in FIG. 6.
Figure 8:
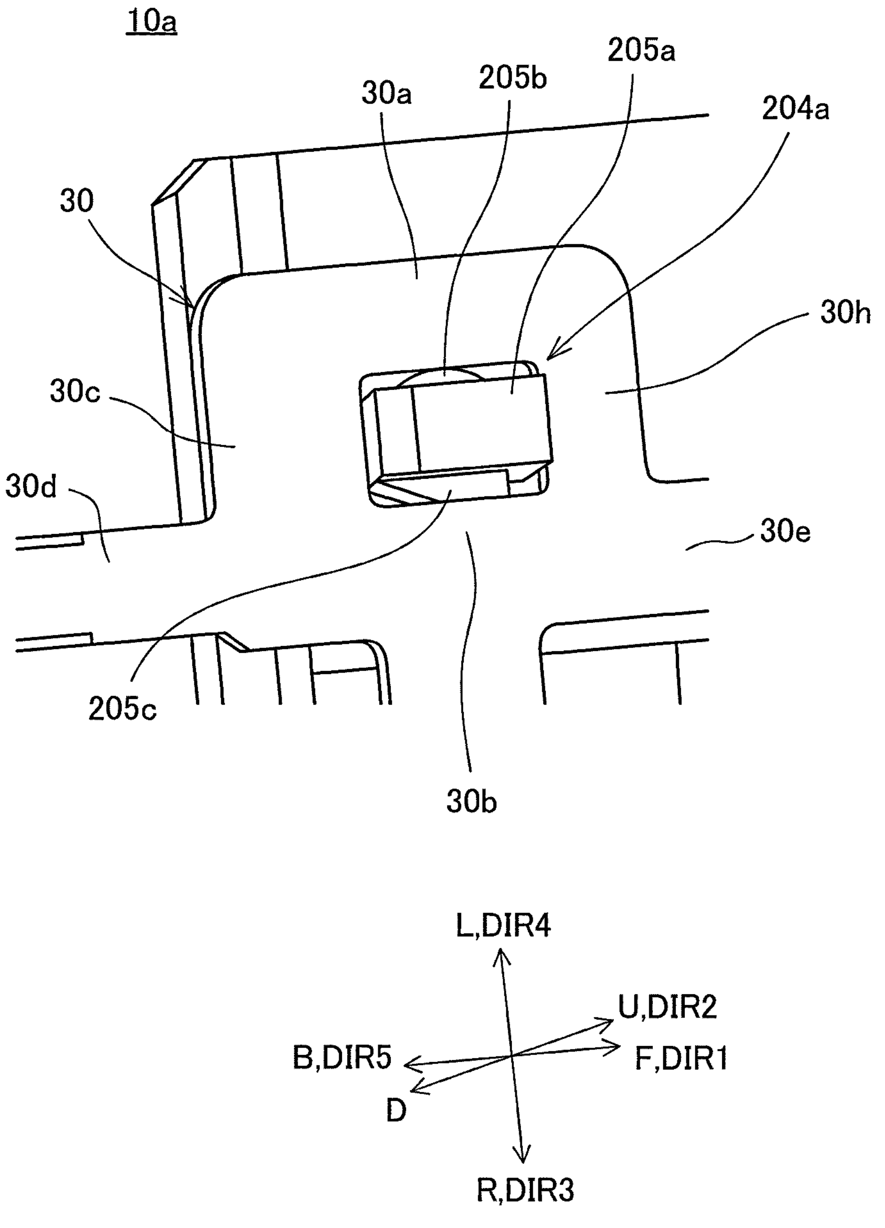
FIG. 8 is a perspective view of the surroundings of a support strut 204*a* of an antenna component 10*a* according to a preferred embodiment of the present invention.

A structure of an antenna component 10 according to a preferred embodiment of the present invention will be described below with reference to the drawings. FIG. 1 is a perspective view of the antenna component 10. FIG. 2 is a perspective view of the antenna component 10 from which a cover 12 is removed. FIG. 3 is a perspective view of the antenna component 10 from which a cover 12, a cover 14, and a spacer 18 are removed. FIG. 4 is a perspective view of a bobbin 20*a*, a first terminal 30, and a second terminal 32. FIG. 5 is a perspective view of the bobbin 20*a*. FIG. 6 is a cross-sectional view of the bobbin 20*a*, the first terminal 30, and the second terminal 32 taken perpendicular to a vertical direction. FIG. 7 is an enlarged view of a front portion of the first terminal 30 illustrated in FIG. 6.

Herein, the direction in which a body 20 of the antenna component 10 extends is defined as a front-rear direction. The direction in which the first terminal 30 and the second terminal 32 are arranged side by side is defined as a lateral direction. The direction perpendicular or substantially perpendicular to the front-rear direction and the lateral direction is defined as a vertical direction. The front-rear direction, the lateral direction, and the vertical direction are perpendicular or substantially perpendicular to each other. The front-rear direction, the lateral direction, and the vertical direction are defined for convenience, and do not have to respectively match the front-rear direction, the lateral direction, and the vertical direction of the antenna component 10 during actual use.

The antenna component 10 is, for example, a transmission antenna component in a near-field communication system for a low frequency (LF) band (about 30 kHz to about 300 kHz). The antenna component 10 is mainly used in a keyless entry system for remotely controlling locking or unlocking of car doors.

As illustrated in FIGS. 1 to 3, the antenna component 10 includes covers 12 and 14, a spacer 18, a body 20, a coil antenna 22, connection terminals 24 and 26, a capacitor 28, a first terminal 30, and a second terminal 32.

The body 20 extends in a front direction (a first direction DIR1). As illustrated in FIG. 3, the body 20 includes a bobbin 20*a* and a core 20*b*. The core 20*b* is a rectangular or substantially rectangular plate-shaped member including long sides extending in the front-rear direction when viewed in the vertical direction. Examples of the material of the core 20*b* include Mn—Zn ferrite and other amorphous magnetic materials.

As illustrated in FIG. 3, the bobbin 20*a* supports the core 20*b*, the coil antenna 22, the connection terminals 24 and 26, the capacitor 28, the first terminal 30, and the second terminal 32. As illustrated in FIG. 4, the bobbin 20*a* includes a terminal support portion 200 and a core support portion 202. The terminal support portion 200 occupies the rear end portion of the bobbin 20*a*. The terminal support portion 200 supports the first terminal 30 and the second terminal 32. The details of the terminal support portion 200 will be described later.

As illustrated in FIG. 3, the core support portion 202 corresponds to the portion in the bobbin 20*a* excluding the terminal support portion 200. The core support portion 202 supports the core 20*b*, the coil antenna 22, the connection terminals 24 and 26, and the capacitor 28. More specifically, the core support portion 202 has a frame shape surrounding the core 20*b* when viewed in the vertical direction. The material of the bobbin 20*a* with the above structure is, for example, a resin such as polybutylene terephthalate (PBT).

As illustrated in FIG. 3, the connection terminals 24 and 26 are attached to the upper surface of the core support portion 202. A material of the connection terminals 24 and 26 is an electroconductive material such as, for example, copper. The connection terminal 24 and the connection terminal 26 are arranged in this order from the front to the rear. The connection terminal 24 includes a first end portion t1 and a second end portion t2. The connection terminal 26 includes a first end portion t11 and a second end portion t12. The capacitor 28 is connected to the second end portion t2 of the connection terminal 24 and the first end portion t11 of the connection terminal 26. In other words, the capacitor 28 is serially connected to the connection terminal 24 and the connection terminal 26.

As illustrated in FIG. 3, the coil antenna 22 is a conducting wire wound around the body 20 about an axis extending in the front direction (first direction DIR1) and defining a center axis. More specifically, the coil antenna 22 includes a conducting wire wound around the core support portion 202 (refer to FIG. 4) of the body 20. The conducting wire includes a core wire made of an electroconductive material such as, for example, copper, and an insulating material with which the surface of the core wire is coated. Thus, the coil antenna 22 surrounds the core 20*b* when viewed in the front-rear direction. The coil antenna 22 includes a first coil portion 22*a*, a second coil portion 22*b*, and a third coil portion 22*c*.

When viewed in the vertical direction, the first coil portion 22*a* overlaps a front portion of the core 20*b*. The first coil portion 22*a* is wound around the core support portion 202 and the core 20*b*. The first coil portion 22*a* includes a first-coil-portion first end portion 22*at*1 and a first-coil-portion second end portion 22*at*2 (the first-coil-portion first end portion 22*at*1 is not illustrated).

When viewed in the vertical direction, the second coil portion 22*b* overlaps a center portion of the core 20*b*. Thus, the second coil portion 22*b* is located at the rear of the first coil portion 22*a*. The second coil portion 22*b* is wound around the core support portion 202 and the core 20*b*. The second coil portion 22*b* includes a second-coil-portion first end portion 22*bt*1 and a second-coil-portion second end portion 22*bt*2 (the second-coil-portion first end portion 22*bt*1 is not illustrated). The first coil portion 22*a* and the second coil portion 22*b* are located in front of the connection terminals 24 and 26 and the capacitor 28.

When viewed in the vertical direction, the third coil portion 22*c* overlaps a rear portion of the core 20*b*. The third coil portion 22*c* is wound around the core support portion 202 and the core 20*b*. The third coil portion 22*c* includes a third-coil-portion first end portion 22*ct*1 and a third-coil-portion second end portion 22*ct*2. The third coil portion 22*c* is located at the rear of the connection terminals 24 and 26 and the capacitor 28.

The first-coil-portion first end portion 22*at*1 (not illustrated) and the second-coil-portion first end portion 22*bt*1 (not illustrated) are connected to each other. Thus, the first coil portion 22*a* and the second coil portion 22*b* define a single conducting wire. Thus, the first coil portion 22*a* and the second coil portion 22*b* are serially connected together.

The first-coil-portion second end portion 22*at*2 is connected to the first terminal 30 described later. The second-coil-portion second end portion 22*bt*2 is connected to the first end portion t1 of the connection terminal 24. The third-coil-portion first end portion 22*ct*1 is connected to the second end portion t12 of the connection terminal 26. The third-coil-portion second end portion 22*ct*2 is connected to a second terminal 32, described later.

As described above, the first coil portion 22*a*, the second coil portion 22*b*, and the third coil portion 22*c* are serially connected together in this order between the first terminal 30 and the second terminal 32. In other words, the coil antenna 22 is connected to the first terminal 30 and the second terminal 32. In this case, the coil antenna 22 includes a first end portion T1 and a second end portion T2. The first end portion T1 corresponds to the first-coil-portion second end portion 22*at*2. The second end portion T2 corresponds to the third-coil-portion second end portion 22*ct*2.

The first terminal 30 is supported by the body 20. In the present preferred embodiment, as illustrated in FIG. 4, the first terminal 30 is supported by the terminal support portion 200 of the bobbin 20*a*. As illustrated in FIG. 3, the first terminal 30 is electrically connected to the first end portion T1 of the coil antenna 22. The first terminal 30 is a single metal component. The material of the first terminal 30 is an electroconductive material such as, for example, copper. The installation of the first terminal 30 will be described below in detail.

As illustrated in FIG. 5, the body 20 includes fastening surfaces S1 and S2, support struts 204*a* and 206*a*, first overlapping portions 204*b* and 206*b*, second overlapping portions 204*c* and 206*c*, and stoppers 204*d* and 206*d*. The fastening surfaces S1 and S2, the support struts 204*a* and 206*a*, the first overlapping portions 204*b* and 206*b*, the second overlapping portions 204*c* and 206*c*, and the stoppers 204*d* and 206*d* are provided on the upper surface of the terminal support portion 200.

The fastening surface S1 is a surface facing upward. The fastening surface S1 includes a normal line extending upward (in a second direction DIR2 perpendicular or substantially perpendicular to the first direction DIR1). The fastening surface S1 is located at a left portion of the terminal support portion 200. The fastening surface S1 is located at a rear end portion of the terminal support portion 200.

The support strut 204*a* extends upward (in the second direction DIR2). The support strut 204*a* protrudes upward (in the second direction DIR2) from the fastening surface S1. The support strut 204*a* is located at a left portion of the terminal support portion 200. As illustrated in FIG. 6, the support strut 204*a* includes a support strut body 205*a*, a first protrusion 205*b*, and a second protrusion 205*c*. The support strut body 205*a* extends upward (in the second direction DIR2). The support strut body 205*a* protrudes upward (in the second direction DIR2) from the fastening surface S1. The support strut body 205*a* is a quadrangular or substantially quadrangular prism. When viewed in the vertical direction, the support strut body 205*a* has a rectangular or substantially rectangular shape including two sides extending in the front-rear direction and two sides extending in the lateral direction. The first protrusion 205*b* protrudes leftward (in a fourth direction DIR4) from the support strut body 205*a*. When viewed in the vertical direction (the second direction DIR2), the first protrusion 205*b* has a convex shape. The convex protrudes leftward.

The second protrusion 205*c* protrudes rightward (in a third direction DIR3) from the support strut body 205*a*. The second protrusion 205*c* includes a flat surface. The flat surface includes a normal line extending rightward (in the second direction DIR2).

As illustrated in FIG. 5, the first overlapping portion 204*b* is located above (at a portion in the second direction DIR2 from) the fastening surface S1. The first overlapping portion 204*b* is coupled to the support strut 204*a*. More specifically, the first overlapping portion 204*b* extends leftward from the upper end of the support strut body 205*a*. Thus, a space Sp1 is provided below the first overlapping portion 204*b* and on the left of the support strut 204*a*.

As illustrated in FIG. 5, the second overlapping portion 204*c* is located above (at a portion in the second direction DIR2 from) the fastening surface S1. The second overlapping portion 204*c* is located at the rear of the fastening surface S1. A space Sp2 is provided below the second overlapping portion 204*c*.

As illustrated in FIGS. 5 and 6, the stopper 204*d* is located at the rear of the space Sp2. The stopper 204*d* protrudes upward from the upper surface of the terminal support portion 200.

The fastening surface S2, the support strut 206*a*, the first overlapping portion 206*b*, the second overlapping portion 206*c*, and the stopper 206*d* respectively have structures that are symmetrical or substantially symmetrical halves of the fastening surface S1, the support strut 204*a*, the first overlapping portion 204*b*, the second overlapping portion 204*c*, and the stopper 204*d*. Thus, the fastening surface S2, the support strut 206*a*, the first overlapping portion 206*b*, the second overlapping portion 206*c*, and the stopper 206*d* will not be described.

As illustrated in FIG. 6, the first terminal 30 includes a first fastening portion 30*a*, a second fastening portion 30*b*, a first coupling portion 30*c*, a contact portion 30*d*, a third fastening portion 30*e*, a protrusion 30*f*, and a connecting portion 30*g*. The first fastening portion 30*a* extends in the front-rear direction. The first fastening portion 30*a* is located on the left of the support strut 204*a*. Thus, as illustrated in FIGS. 5 and 6, the first terminal 30 is located inside the space Sp1. As illustrated in FIGS. 5 and 6, when viewed in the vertical direction (the second direction DIR2), the first overlapping portion 204*b* overlaps the first fastening portion 30*a*. The first overlapping portion 204*b* is located over the first fastening portion 30*a*.

As illustrated in FIG. 6, the second fastening portion 30*b* extends in the front-rear direction. The second fastening portion 30*b* is located on the right of the support strut 204*a*.

The first coupling portion 30*c* is located at the rear of (at a portion in a fifth direction DIR5 perpendicular or substantially perpendicular to the second direction DIR2 from) the support strut 204*a*. The first coupling portion 30*c* is coupled to the first protrusion 205*b* and the second protrusion 205*c*. In the present preferred embodiment, the first coupling portion 30*c* is coupled to a rear end portion of the first fastening portion 30*a* and a rear end portion of the second fastening portion 30*b*. Thus, the first fastening portion 30*a*, the second fastening portion 30*b*, and the first coupling portion 30*c* have a U shape when viewed in the vertical direction.

The distance between the first fastening portion 30*a* and the second fastening portion 30*b* when the first terminal 30 is not attached to the body 20 is smaller than the distance between the left end of the first protrusion 205*b* and the right end of the second protrusion 205*c*. Thus, when the first terminal 30 is attached to the body 20, the first fastening portion 30*a*, the second fastening portion 30*b*, and the first coupling portion 30*c* are elastically deformed. Therefore, the first fastening portion 30*a* exerts a force in the rightward direction (the third direction DIR3 perpendicular to the second direction DIR2) on the support strut 204*a*. More precisely, the first fastening portion 30*a* exerts a force in the rightward direction (the third direction DIR3) on the first protrusion 205*b*. The second fastening portion 30*b* exerts a force in the leftward direction (the fourth direction DIR4 opposite to the third direction DIR3) on the support strut 204*a*. More precisely, the second fastening portion 30*b* exerts a force in the leftward direction (the third direction DIR3) on the second protrusion 205*c*.

As illustrated in FIG. 6, the contact portion 30*d* is coupled to at least one of the first fastening portion 30*a*, the second fastening portion 30*b*, or the first coupling portion 30*c*. In the present preferred embodiment, the contact portion 30*d* is coupled to the rear end of the second fastening portion 30*b*. The contact portion 30*d* extends rearward (in the fifth direction DIR5 perpendicular to the second direction DIR2). When the antenna component 10 is connected to a connector not illustrated, the contact portion 30*d* comes into contact with an input/output terminal of the connector.

As illustrated in FIG. 6, the third fastening portion 30*e* is coupled to the second fastening portion 30*b*. In the present preferred embodiment, the third fastening portion 30*e* is coupled to a front end of the second fastening portion 30*b*. The third fastening portion 30*e* extends in the front direction (the first direction DIR1) from the second fastening portion 30*b*. As illustrated in FIGS. 5 and 6, the front end portion of the third fastening portion 30*e* is located in the space Sp2. Thus, when viewed in the vertical direction (the second direction DIR2), the second overlapping portion 204*c* overlaps the front end portion (the end portion in the first direction DIR1) of the third fastening portion 30*e*. The second overlapping portion 204*c* is located over the third fastening portion 30*e*.

As illustrated in FIG. 7, a protrusion 208*a* of the terminal support portion 200 is in contact with the left surface of the third fastening portion 30*e*. A protrusion 208*b* of the terminal support portion 200 is in contact with the right surface of the third fastening portion 30*e*.

As illustrated in FIG. 7, the protrusion 30*f* protrudes rightward or leftward (in the third direction DIR3 or the fourth direction DIR4) from the third fastening portion 30*e*. In the present preferred embodiment, the protrusion 30*f* protrudes rightward from the third fastening portion 30*e*. In this case, the stopper 204*d* is located at the rear of (at a portion in the fifth direction DIR5 from) the protrusion 30*f*. The stopper 204*d* is in contact with the protrusion 30*f*. Instead, a slight gap may be provided between the stopper 204*d* and the protrusion 30*f*.

As illustrated in FIGS. 6 and 7, the connecting portion 30*g* extends to the front left from the third fastening portion 30*e*. As illustrated in FIG. 3, the first end portion T1 of the coil antenna 22 is connected to the connecting portion 30*g*.

The second terminal 32 is supported by the body 20. The second terminal 32 is electrically connected to the second end portion T2 of the coil antenna 22. The second terminal 32 has a structure that is a symmetrical or substantially symmetrical half of the first terminal 30. Thus, the second terminal 32 will not be described.

As illustrated in FIG. 2, the spacer 18 is located in front of the first coil portion 22*a* and the second coil portion 22*b*, above the first coil portion 22*a* and the second coil portion 22*b*, and below the first coil portion 22*a* and the second coil portion 22*b*. Thus, the spacer 18 has a U shape when viewed in the lateral direction. The material of the spacer 18 is, for example, a resin.

The cover 14 is located at a rear end portion of the body 20. The cover 14 has a cylindrical or substantially cylindrical shape including a center axis extending in the front-rear direction. The cover 14 covers the first terminal 30 and the second terminal 32. However, the rear end of the cover 14 is open.

As illustrated in FIG. 1, the cover 12 covers the spacer 18, the body 20, the coil antenna 22, the connection terminals 24 and 26, and the capacitor 28. The front end of the cover 12 is not open. The rear end of the cover 12 is open. The material of the covers 12 and 14 is, for example, a resin.

Advantageous Effects

In the antenna component 10, the first terminal 30 can be firmly fastened to the body 20. More specifically, the first fastening portion 30*a* exerts a force in the rightward direction on the support strut 204*a*. The second fastening portion 30*b* exerts a force in the leftward direction on the support strut 204*a*. Specifically, with elastic deformation of the first terminal 30, the first terminal 30 supports the support strut 204*a* in the lateral direction. Thus, when the first terminal 30 is attached to the body 20, no gap is left between the first terminal 30 and the support strut 204*a* regardless of when the support strut 204*a* is slightly shaved by the first terminal 30. Thus, the first terminal 30 can be firmly fastened to the body 20 in the antenna component 10.

In the antenna component 10, the first terminal 30 supports the support strut 204*a* in the lateral direction with elastic deformation of the first terminal 30. Thus, the first terminal 30 is prevented from being rotated about the axis extending in the front-rear direction.

In the antenna component 10, the first terminal 30 supports the support strut 204*a* in the lateral direction with elastic deformation of the first terminal 30. Thus, the first terminal 30 is not required to be welded to the bobbin 20*a*. Instead, the first terminal 30 may be welded to the bobbin 20*a*.

In the antenna component 10, the first terminal 30 can be easily attached to the body 20. More specifically, the first fastening portion 30*a* exerts a force in the rightward direction on the first protrusion 205*b*. The second fastening portion 30*b* exerts a force in the leftward direction on the second protrusion 205*c*. Specifically, the first fastening portion 30*a* and the second fastening portion 30*b* exert forces on the respective protrusions. Thus, when the first terminal 30 is slid in the front direction with respect to the body 20, the first terminal 30 can be attached to the body 20 while widening the distance between the first fastening portion 30*a* and the second fastening portion 30*b* with the first protrusion 205*b* and the second protrusion 205*c*. In this manner, the first terminal 30 can be easily attached to the body 20 in the antenna component 10.

In the antenna component 10, the position of the first terminal 30 with respect to the body 20 can be easily fixed. More specifically, when viewed in the vertical direction, the first protrusion 205*b* has a convex shape. The second protrusion 205*c* includes a flat surface including a normal line extending rightward. Thus, the second fastening portion 30*b* is in contact with the flat surface of the second protrusion 205*c*. Thus, the position of the second fastening portion 30*b* with respect to the second protrusion 205*c* is fixed. Thus, the position of the first terminal 30 with respect to the body 20 can be easily fixed in the antenna component 10.

In the antenna component 10, the first terminal 30 is prevented from being detached from the body 20. More specifically, when viewed in the vertical direction, the first overlapping portion 204*b* overlaps the first fastening portion 30*a*. Thus, the first overlapping portion 204*b* prevents a shift of the first fastening portion 30*a* in the vertical direction with respect to the body 20. Thus, the first terminal 30 is prevented from being detached from the body 20 in the antenna component 10.

The first terminal 30 is prevented from being detached from the body 20 in the antenna component 10. More specifically, when viewed in the vertical direction, the second overlapping portion 204*c* overlaps the front end portion of the third fastening portion 30*e*. Thus, the second overlapping portion 204*c* prevents a shift of the third fastening portion 30*e* in the vertical direction with respect to the body 20. Thus, the first terminal 30 is prevented from being detached from the body 20 in the antenna component 10.

In the antenna component 10, the first terminal 30 is prevented from being detached from the body 20. More specifically, the stopper 204*d* is located rearward from the protrusion 30*f*, and in contact with the protrusion 30*f*. Thus, the stopper 204*d* prevents the first terminal 30 from shifting rearward with respect to the body 20. Thus, the first terminal 30 is prevented from being detached from the body 20 in the antenna component 10.

First Modified Example

An antenna component 10*a* according to a first modified example of a preferred embodiment of the present invention will be described below with reference to the drawings. FIG.

8 is a perspective view of the surroundings of the support strut 204*a* of the antenna component 10*a*.

The antenna component 10*a* differs from the antenna component 10 in that the first terminal 30 additionally includes a second coupling portion 30*h*. More specifically, the second coupling portion 30*h* is located in front of (at a portion in the first direction DIR1 from) the support strut 204*a*. The second coupling portion 30*h* is coupled to the first fastening portion 30*a* and the second fastening portion 30*b*. Thus, when viewed in the vertical direction, the first fastening portion 30*a*, the second fastening portion 30*b*, the first coupling portion 30*c*, and the second coupling portion 30*h* define a loop shape surrounding the support strut 204*a*. Other components of the antenna component 10*a* are the same or substantially the same as those of the antenna component 10, and will not be described. The antenna component 10*a* can achieve the same or substantially the same advantageous effects as the antenna component 10.

Second Modified Example

Figure 9:
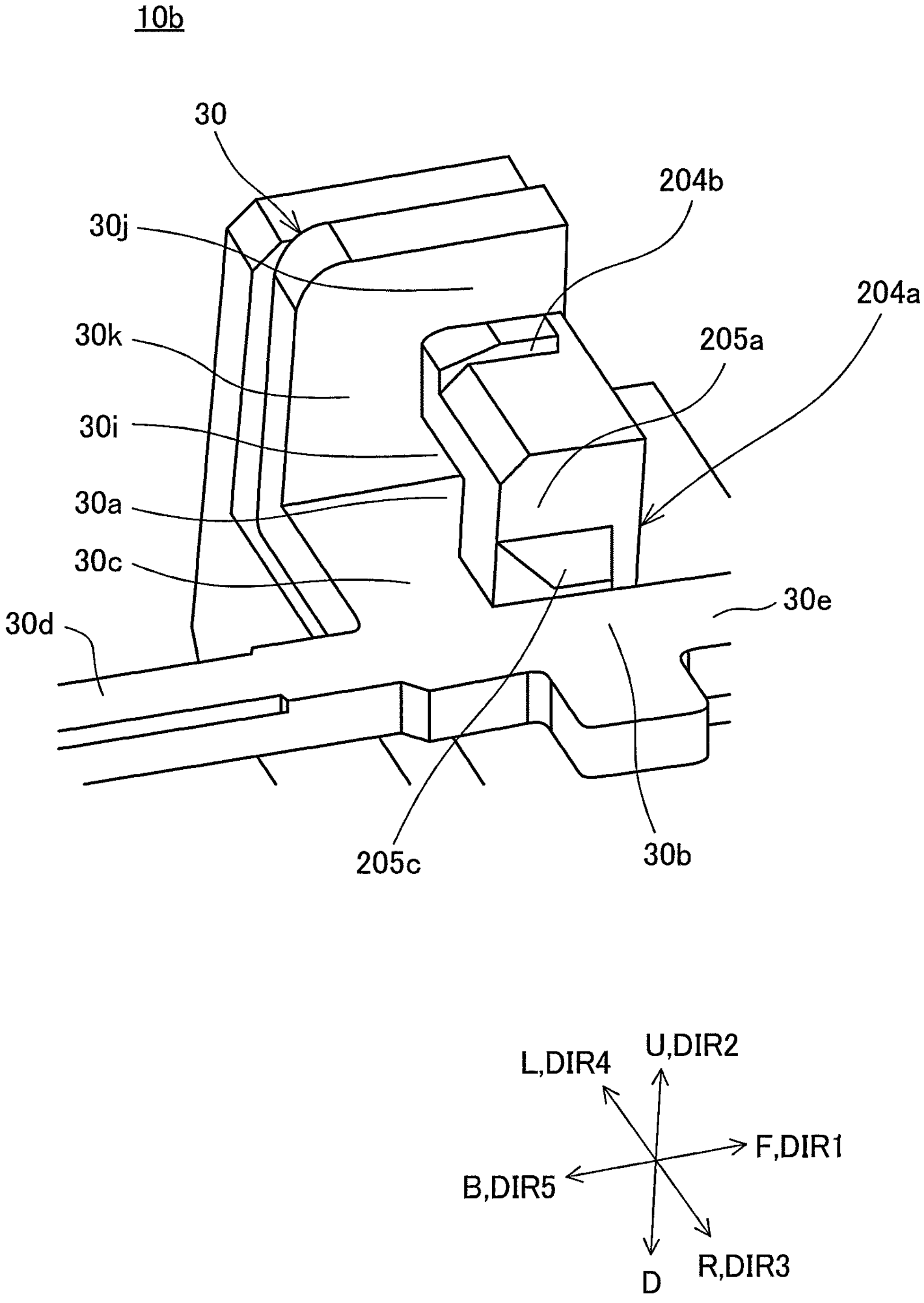
FIG. 9 is a perspective view of the surroundings of a support strut 204*a* of an antenna component 10*b* according to a preferred embodiment of the present invention.

An antenna component 10*b* according to a second modified example of a preferred embodiment of the present invention will be described below with reference to the drawings. FIG. 9 is a perspective view of the surroundings of the support strut 204*a* of the antenna component 10*b*.

The antenna component 10*b* differs from the antenna component 10 in that the first terminal 30 further includes a fourth fastening portion 30*i*, a fifth fastening portion 30*j*, and a third coupling portion 30*k*. More specifically, the fourth fastening portion 30*i* extends in the front-rear direction. The fourth fastening portion 30*i* is located below the first overlapping portion 204*b*. The fourth fastening portion 30*i* is coupled to the first fastening portion 30*a*.

The fifth fastening portion 30*j* extends in the front-rear direction. The fifth fastening portion 30*j* is located over the first overlapping portion 204*b*. The third coupling portion 30*k* is located at the rear of the first overlapping portion 204*b*. The third coupling portion 30*k* is coupled to the fourth fastening portion 30*i* and the fifth fastening portion 30*j*.

The fourth fastening portion 30*i* exerts a force in the upward direction on the first overlapping portion 204*b*. The fifth fastening portion 30*j* exerts a force in the downward direction on the first overlapping portion 204*b*. Other components in the antenna component 10*b* are the same as those of the antenna component 10, and thus will not be described. The antenna component 10*b* can achieve the same or substantially the same advantageous effects as the antenna component 10.

According to the antenna component 10*b*, the fourth fastening portion 30*i* and the fifth fastening portion 30*j* supports the first overlapping portion 204*b* in the vertical direction. Thus, the first terminal 30 is prevented from being shifted in the vertical direction with respect to the body 20.

OTHER PREFERRED EMBODIMENTS

An antenna component according to the present invention is not limited to the above-described antenna component 10, 10*a*, or 10*b*, and may be changed within the scope of the present invention. The components in the antenna components 10, 10*a*, and 10*b* may be combined as appropriate.

Although the first direction DIR1 is described as being the front direction, the first direction DIR1 may be another direction than the front direction.

Although the second direction DIR2 is described as being the upward direction, the second direction DIR2 may be another direction than the upward direction. The second direction DIR2 only needs to be perpendicular or substantially perpendicular to the first direction DIR1.

Although the third direction DIR3 is described as being the rightward direction, the third direction DIR3 may be another direction than the rightward direction. The third direction DIR3 only needs to be perpendicular or substantially perpendicular to the second direction DIR2.

Although the fourth direction DIR4 is described as being the leftward direction, the fourth direction DIR4 may be another direction than the leftward direction. The fourth direction DIR4 only needs to be a direction opposite to the third direction DIR3.

Although the fifth direction DIR5 is described as being the rearward direction, the fifth direction DIR5 may be a direction another direction than the rearward direction. The fifth direction DIR5 only needs to be perpendicular or substantially perpendicular to the second direction DIR2.

The first protrusion 205*b* and the second protrusion 205*c* are not necessary components.

The first protrusion 205*b* may include, for example, a flat surface when viewed in the vertical direction. The second protrusion 205*c* may have, for example, a convex shape when viewed in the vertical direction.

The first overlapping portion 204*b* and the second overlapping portion 204*c* are not necessary components.

The stopper 204*d* is not a necessary component.

The contact portion 30*d* only needs to be coupled to at least one of the first fastening portion 30*a*, the second fastening portion 30*b*, or the first coupling portion 30*c*.

The first terminal 30 only needs to be electrically connected to the first end portion T1 of the coil antenna 22. Thus, the first terminal 30 may be indirectly connected to the first end portion T1 of the coil antenna 22.

The second terminal 32 only needs to be electrically connected to the second end portion T2 of the coil antenna 22. Thus, the second terminal 32 may be indirectly connected to the second end portion T2 of the coil antenna 22.

The protrusion 30*f* may protrude leftward.

The antenna component 10*b* may eliminate the first fastening portion 30*a*, the second fastening portion 30*b*, and the first coupling portion 30*c*. In this case, the first overlapping portion 204*b* defines and functions as a support strut.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna component, comprising:

a body extending in a first direction;

a coil antenna including a conducting wire wound around the body about an axis extending in the first direction and defining a center axis, the coil antenna including a first end portion and a second end portion;

a first terminal supported by the body and electrically connected to the first end portion, the first terminal being a single metal member; and a second terminal supported by the body and electrically connected to the second end portion; wherein the body includes a support strut extending in a second direction perpendicular or substantially perpendicular to the first direction; and the first terminal includes:

a first fastening portion to exert a force on the support strut in a third direction perpendicular or substantially perpendicular to the second direction;

a second fastening portion to exert a force on the support strut in a fourth direction opposite to the third direction;

a first coupling portion coupled to the first fastening portion and the second fastening portion; and a contact portion coupled to at least one of the first fastening portion, the second fastening portion, or the first coupling portion, the contact portion extending in a fifth direction perpendicular or substantially perpendicular to the second direction.

2. The antenna component according to claim 1, wherein the support strut includes:

a support strut body extending in the second direction;

a first protrusion protruding from the support strut body in the fourth direction; and a second protrusion protruding from the support strut body in the third direction;

the first fastening portion exerts a force on the first protrusion in the third direction; and the second fastening portion exerts a force on the second protrusion in the fourth direction.

3. The antenna component according to claim 2, wherein the first protrusion has a convex shape when viewed in the second direction; and the second protrusion includes a flat surface with a normal line extending in the third direction.

4. The antenna component according to claim 1, wherein the body further includes:

a fastening surface including a normal line extending in the second direction; and a first overlapping portion located in the second direction from the fastening surface and coupled to the support strut;

the support strut protrudes from the fastening surface in the second direction; and the first overlapping portion overlaps the first fastening portion when viewed in the second direction.

5. The antenna component according to claim 1, wherein the first coupling portion is located in the fifth direction from the support strut;

the first terminal further includes:

a third fastening portion coupled to the second fastening portion and extending in the first direction from the second fastening portion;

the body further includes:

a fastening surface including a normal line extending in the second direction; and a second overlapping portion located in the second direction from the fastening surface; and the second overlapping portion overlaps an end portion of the third fastening portion in the first direction when viewed in the second direction.

6. The antenna component according to claim 5, wherein the first terminal further includes:

a protrusion protruding from the third fastening portion in the third direction or the fourth direction;

the body further includes:

a stopper; and the stopper is located in the fifth direction from the protrusion and is in contact with the protrusion.

7. The antenna component according to claim 1, wherein the fifth direction is opposite to the first direction;

the first coupling portion is located in the fifth direction from the support strut; and the first terminal further includes:

a second coupling portion located in the first direction of the support strut.

8. The antenna component according to claim 1, wherein the body includes a bobbin and a core.

9. The antenna component according to claim 8, wherein the core includes a rectangular or substantially rectangular plate-shaped member including long sides extending in the first direction.

10. The antenna component according to claim 1, wherein the conducting wire includes a core wire made of an electroconductive material and an insulating material coated on a surface of the core wire.

11. The antenna component according to claim 10, wherein the core wire is made of copper.

12. The antenna component according to claim 1, wherein the support strut body has a quadrangular or substantially quadrangular prism shape.

13. The antenna component according to claim 1, wherein the first fastening portion, the second fastening portion, and the first coupling portion have a U shape when viewed in the second direction.

14. The antenna component according to claim 1, further comprising a cover having a cylindrical or substantially cylindrical shape and extending in the first direction.

15. The antenna component according to claim 14, wherein the cover covers the first terminal and the second terminal.

* * * * *